United States Patent
Halvorson et al.

[15] 3,691,226
[45] Sept. 12, 1972

[54] ANTI-FOULANT IN ACRYLONITRILE MANUFACTURE

[72] Inventors: David O. Halvorson, Pitman, N.J.; Sterling N. Vines, Memphis, Tenn.

[73] Assignee: E. I. du Pont de Nemours and Company, Wilmington, Del.

[22] Filed: Nov. 12, 1970

[21] Appl. No.: 88,991

[52] U.S. Cl............................260/465.9, 260/465.3
[51] Int. Cl..............................................C07c 121/32
[58] Field of Search........................260/465.9, 465.3

[56] References Cited

UNITED STATES PATENTS

| | | |
|---|---|---|
| 2,770,645 | 11/1956 | McDonald et al......260/465.9 |
| 3,012,062 | 12/1961 | Casper et al............260/465.9 |
| 3,535,849 | 10/1970 | Hausweiler et al..260/465.9 X |

Primary Examiner—Joseph P. Brust
Attorney—Samuel S. Blight

[57] ABSTRACT

Lignosulfonate metal salts are added to the water used to absorb acrylonitrile to minimize deposits which otherwise foul the heat transfer surfaces of the heat exchangers used to cool the water before recycling it to the system.

11 Claims, No Drawings

ANTI-FOULANT IN ACRYLONITRILE MANUFACTURE

BACKGROUND OF THE INVENTION

This invention is directed toward a process for the preparation of acrylonitrile and, more particularly, to a process wherein certain lignosulfonates are added to the water which was used to absorb the acrylonitrile before the water is cooled and recycled to the absorption step.

When acrylonitrile is made by the ammoxidation of propylene in a gas-phase catalytic reaction the product gases are colled and unreacted ammonia in the product gases is neutralized. These cooled gases are then passed to an absorber in which the acrylonitrile is recovered by absorption in a suitable solvent, e.g. chilled water. The absorbed acrylonitrile is recovered by distillation and a portion of the bottoms from the distillation is cooled and recycled to the absorption step.

This recycle contains both inorganic and organic compounds in the form of monomers, oligomers, prepolymers, and polymers in various combinations. These compounds foul the heat exchange surfaces of the heat exchangers used to cool the solvent prior to recycle. In order to minimize this fouling when water is employed as the solvent, a portion of the recycle water must be purged and replenished with fresh water. The purge retards formation of solids on the heat exchanger surfaces by removing some of the foulants, but purging is costly because the purge is toxic and must incinerated. Fouled heat exchanger surfaces reduce the coefficient of heat transfer thereby increasing the amount of coolant which must be employed to realize the same amount of cooling obtained on clean surfaces. Eventually, the heat exchanger must be manually cleaned. Reduction of the water purge and/or fouling of the heat exchangers offers improved economics.

SUMMARY OF THE INVENTION

It has now been discovered that lignosulfonate salts of alkali and alkaline earth metals which when added to the solvent for the acrylonitrile will substantially reduce, if not eliminate, deposits of materials which cause fouling of the heat transfer surfaces when the solvent is cooled.

DETAILED DESCRIPTION OF THE INVENTION

In one method for the manufacture of acrylonitrile gaseous reactants from the gas phase ammoxidation of propylene are cooled from an initial temperature of about 400°–510°C. and any ammonia is neutralized by passing the gas countercurrent to an aqueous stream of acid such as sulfuric acid, to neutralize and recover any ammonia present such as disclosed in U.S. Pats. Nos. 3,404,947 and 3,408,157. The resultant gases which contain major amounts of nitrogen and acrylonitrile and minor amounts of hydrogen cyanide, acetonitrile, carbon dioxide, carbon monoxide, propylene, ammonia, water, oxygen, acrolein and certain acid aldehydes and nitriles are contacted with water at at temperature of 1°–40°C. to form a solution containing less than about 10 percent by weight acrylonitrile. The acrylonitrile (along with some water and hydrogen cyanide) is separated from any acetonitrile present by distillation and recovered overhead. Volatiles are separated from the resultant aqueous stream in a stripper. The bottoms from the stripper contain approximately 1 percent organic material giving the bottoms the typical analysis:

| | |
|---|---|
| 160 | ppm hydrogen cyanide |
| 20 | ppm acrylonitrile |
| 120 | ppm acetic acid |
| 500 | ppm fumaronitrile |
| 500 | ppm nicotinonitrile |
| 5400 | ppm succinonitrile |
| 300 | ppm maleonitrile | as well as water-soluble polymers such as polyacrylic acid and its salts.

It is convenient to cool a substantial portion of this bottoms stream to a temperature in the range 1°–40°C. before it is recycled and contacted with any substantial amount of acrylonitrile. As the process is operated materials form which foul the heat exchangers thereby decreasing heat transfer efficiency. In order to remove the foulants and minimize fouling, a portion of the bottoms stream is usually continuously purged from the system and is replace with water which is free from fouling impurities. Although the concentration of impurities reaches equilibrium during the operation of the process, the buildup of foulants continues and eventually the cooling system must be manually cleaned to restore efficiency.

The antifouling agents which are added to the bottoms are referred to generally as lignosulfonates, are water soluble polyelectrolytes, are dispersants and are in the form of alkali metal salts and alkaline earth metal salts and mixtures thereof. The alkali metal lignosulfonates are preferred. Although it is not known with certainty, the structure of the sodium salt is believed to be of the following type:

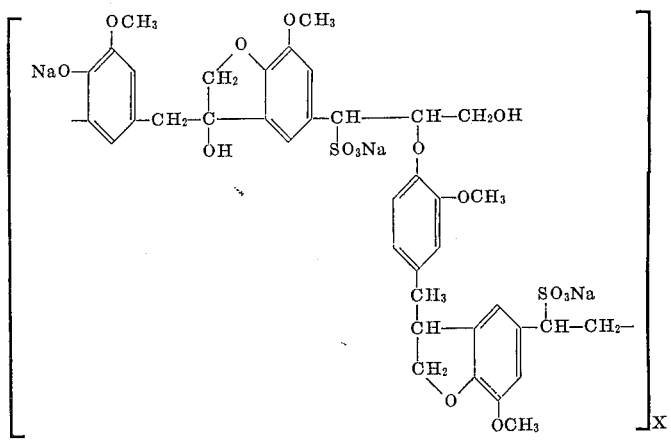

wherein X = 1–100

The sulfonates are available commercially in many forms. For example, a satisfactory form is a nearly black aqueous solution of the natural organic polyelectrolyte which is sold under the trade name "Betz 402" (Sp. Gr.—1.145, Viscosity at 60°F. — 21 cps.), the solids portions of which constitutes approximately 30 percent by weight of the formulation. These solids exhibit a spectrum which matches that of known sodium lignosulfonate and analyze 47.2 percent carbon, 4.7 percent hydrogen, 5.7 percent sulfur in addition to sodium and no nitrogen. The volatile portions of this commercial lignosulfonate are water and minor amounts of methanol, acetone, dimethyl sulfide and o-methoxyphenol. The concentration of the lignosulfonates employed will be dictated by the degree of dispersion desired which in turn is directly related to the amount of purge taken and is usually in the range 0.0015–1.0 percent by weight based upon the weight of the recycle water and preferably is present at a concentration on the range 0.15–0.2 on the same basis. Generally, the amount of sulfonate required will increase as the amount of purge is decreased. The lignosulfonates may be introduced at any location in the recycle water circuit, e.g. it may be desirable to add the sulfonates to the stream from the absorber and before the stripping column thereby permitting the removal of any undesirable volatile material which may be present in commercially available sulfonates.

The recycle water should be maintained at a pH of 3–7 and preferably of 5–6 through the stripping and cooling operations in order to realize the maximum effect of the polyelectrolyte and to minimize product loss which inevitably occurs at higher pH.

The following examples are presented to illustrate but not to restrict the present invention. Parts and percentages are by weight unless otherwise noted.

EXAMPLE 1

Approximately 900 grams of stripper bottoms having the typical analysis set forth hereinabove along with 0.9 gram of an aqueous solution of a sodium lignosulfonate which was marketed under the trade name "Betz 402" (as described hereinabove) were placed in a resin pot which was equipped with a stirrer and heater. The concentration of sodium lignosulfonate was 0.03 percent by weight based upon the weight of the bottoms. A U-tube of stainless steel having a smooth outer surface was arranged to extend into the pot approximately 1 inch from the sides thereof and secured such that the length of the tube which was immersed in the liquid was constant. The contents of the pot were heated in the range 50°–60°C. for 24 hours during which time water at a temperature of 14°C. was passed through the tube at a rate such that exit temperature was maintained between 16° and 17°C. After the aforementioned period, the U-tube had only a light brown coating weighing 0.0016 gram. When the foregoing experiment was repeated in the absence of the lignosulfonate, heavy fouling of the tube occurred with the weight of foulant ranging between about 0.0051 and 0.0104 gram.

EXAMPLE 2

Example 1 was repeated with the exception that 28 grams of acrylonitrile were added to the resin pot. No adverse effect on the action of the lignosulfonate was observed.

EXAMPLE 3

Example 1 was repeated except that the contents of the pot were boiled under reflux for one hour before the cooling coil was immersed. No adverse effect on the action of the lignosulfonate was observed.

EXAMPLE 4

In order to demonstrate the effect of a 50 percent reduction in the rate of purge, a sample of stripper bottoms having the typical analysis set forth above was concentrated to half-volume by distillation and 900 grams of this concentrate was treated as in Example 1 but without the sulfonate. The inlet water temperature was 20°C. and flow of exit water was adjusted to maintain its temperature in the range 22°–25°C. The U-tube was heavily fouled with 0.0802 gram of a brown-black solid. The example was then repeated with the concentrate containing 0.9 gram of the aqueous solution of sodium lignosulfonate of Example 1. The cooling surface was only fouled with 0.0417 gram of a light-brown-black solid.

EXAMPLE 5

A sample of stripper bottoms having the typical analysis set forth above was concentrated to 60 percent volume by distillation and 900 grams of this concentrate were treated as in Example 1 but without the lignosulfonate. The stainless steel U-tube was fouled with 0.0130 gram of a brown solid. When the foregoing was repeated, but with the addition of 1.8 grams of the aqueous solution of the lignosulfonate of Example 1, only a trace of fouling occurred which amounted to 0.0027 gram.

Substantially similar results were obtained when a mixed calcium, magnesium and sodium lignosulfonate sold under the trade name "Marasperse C-21", or "Marasperse N-22" (a desulfonated lignosulfonate) were substituted for the lignosulfonate of Example 1. Circulation of the stripper bottoms through external apparatus did not adversely affect the performance of the lignosulfonate.

The lignosulfonates are equally effective when lean water is cooled to a temperature 1°–10°C.

We claim:

1. In a process for the preparation of acrylonitrile which comprises absorbing gaseous acrylonitrile from a gas phase ammoxidation reaction into a solvent, recovering said acrylonitrile by distillation from the solvent and thereafter cooling and recycling a portion of the solvent, the improvement which comprises cooling a portion of the recycled solvent in the presence of 0.0015–1 percent by weight based upon the weight of said portion of an alkali or alkaline earth metal lignosulfonate.

2. The process of claim 1 wherein the solvent is water.

3. The process of claim 2 wherein the water is cooled to a temperature in the range 1°–40°C.

4. The process of claim 3 wherein said water is maintained at a pH in the range 3–7.

5. The process of claim 2 wherein said lignosulfonate is substantially sodium lignosulfonate.

6. The process of claim 5 wherein said lignosulfonate is present at a concentration in the range 0.015 to 0.20 percent by weight based upon the weight of said portion.

7. In a process for the preparation of acrylonitrile which comprises quenching the gases from the gas phase ammoxidation of propylene, ammonia and molecular oxygen, absorbing the acrylonitrile from the quenched gases in water at a temperature in the range 1°–40°C., recovering acrylonitrile by distillation from the water and thereafter recycling a portion of the water, the improvement which comprises cooling a portion of the recycle water from which the acrylonitrile has been recovered in the presence of 0.0015–1 percent by weight based upon the weight of the portion of said water of an alkali or alkaline earth metal lignosulfonate and recycling the portion thus cooled to the absorption step.

8. The process of claim 7 wherein the water is maintained at a pH in the range 3–7 during cooling.

9. The process of claim 7 wherein the lignosulfonate is sodium lignosulfonate.

10. The process of claim 8 wherein the metal of the lignosulfonate is a mixture of calcium, magnesium and sodium.

11. The process of claim 8 wherein the water is cooled to a temperature in the range 1°–40°C.

* * * * *